United States Patent [19]
Ohkawa et al.

[11] 3,830,610
[45] Aug. 20, 1974

[54] APPARATUS FOR FORMING RUBBER PRODUCTS SUCH AS A TREAD RUBBER BY EXTRUSION

[75] Inventors: Shunjiro Ohkawa; Yoshihiro Yatabe; Tetsuo Mizuno; Takeshi Matsumura, all of Tokyo, Japan

[73] Assignee: Bridgestone Tire Company, Tokyo, Japan

[22] Filed: Oct. 24, 1973

[21] Appl. No.: 409,157

Related U.S. Application Data
[62] Division of Ser. No. 210,517, Dec. 21, 1971, abandoned.

[30] Foreign Application Priority Data
Dec. 23, 1970 Japan..........................45-116,272

[52] U.S. Cl.................... 425/141, 264/40, 425/381, 425/465, 425/466
[51] Int. Cl.............................................. B29f 3/04
[58] Field of Search........... 425/375, 377, 378, 379, 425/380, 381, 461, 465, 466, 140, 141; 264/176, 177 R, 40, 167; 138/45, 46

[56] References Cited
UNITED STATES PATENTS

| | | | |
|---|---|---|---|
| 1,252,821 | 1/1918 | Lewis................................. | 425/466 |
| 3,003,245 | 10/1961 | Nunez, Jr........................ | 425/376 X |
| 3,093,860 | 6/1963 | Eilersen.......................... | 425/466 X |
| 3,323,169 | 6/1967 | Vitellaro......................... | 425/466 X |
| 3,407,441 | 10/1968 | Vigansky et al................... | 425/461 |

*Primary Examiner*—R. Spencer Annear
*Assistant Examiner*—Mark Rosenbaum
*Attorney, Agent, or Firm*—Fleit, Gipple & Jacobson

[57] ABSTRACT

An apparatus for forming rubber products such as a tread rubber by extrusion in which rubber is extruded through an extruding die opening which is formed by the lower edge of an upper slidable thin sheet shaped die piece and the upper edge of a lower plate shaped die piece. The upper slidable thin sheet shaped die piece is constructed by laminating a number of sheet units side by side and each sheet unit consists of an elongated thin sheet piece adapted to be moved in a transverse direction and having at its center portion an inclined groove and of a thin sheet die piece arranged perpendicular to said elongated thin sheet piece and provided at its upper end with a latch portion engaged in said inclined groove. The configuration of the extruding die opening is adjusted to a given configuration by moving upwards and downwards each sheet unit consisting of the upper thin sheet shaped die piece. The configuration of the rubber products extruded through the extruding die opening is adjusted by measuring the configuration and then comparing the measured results with a standard configuration. The adjusting operation is automatically effected under an electronic program using a tape or card punched with holes corresponding to die openings which are similar in contour to given extruding die openings and coded into a program.

8 Claims, 6 Drawing Figures

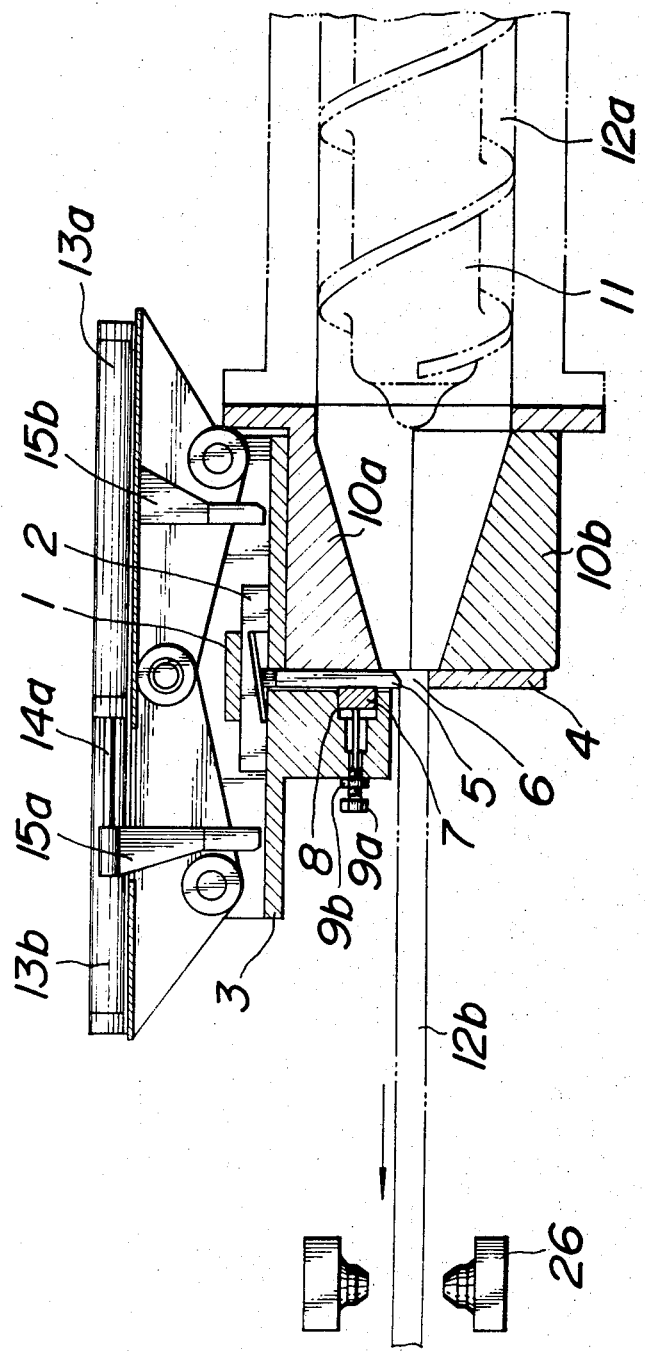

APPARATUS FOR FORMING RUBBER PRODUCTS SUCH AS A TREAD RUBBER BY EXTRUSION

This is a division of application Ser. No. 210,517 filed Dec. 21, 1971 now abandoned.

This invention relates to an apparatus for forming rubber products such as a tread rubber by extrusion, and more particularly to an apparatus for forming a tread rubber by extrusion, in which an extruding die secured to the head portions of an extruding apparatus can be adjusted in dependence upon the configuration of the tread rubber and upon the extruding conditions.

Heretofore, it has been proposed to form rubber products each having different contour such as a tread rubber for use in pneumatic tires by a method comprising preparing beforehand several kinds of die pieces for determining the configuration of a tread rubber for use in pneumatic tires for each size of the tires, selecting die pieces each having a desired size, mounting said die pieces on head portions of an extruding apparatus to form a desired extruding die opening, and extruding rubber through said die opening to form a tread rubber having a desired configuration. Another method of forming rubber products by extrusion has also been proposed, comprising inserting a wooden mold between an upper die piece made up of laminated thin iron plates and a lower die piece and forming an extruding die opening by holding the upper die piece by means of a bladder made of rubber, and extruding rubber through said extruding die opening to form a rubber product.

The above mentioned conventional methods, however, have disadvantages since in case of changing the size of tires it is troublesome to insert die pieces or wooden molds which are the same in configuration as the rubber product to be formed by extrusion, and since this insertion must be effected by careful and skilled operations.

Moreover, in case of changing the size of tires use must be made of new die pieces or wooden molds. The rubber product to be formed by extrusion is soft and liable to be contracted and expanded so that it is almost impossible to bring the rubber product into coincidence with the dimension of the configuration of the die pieces or wooden molds used in practice. At present, newly manufactured die pieces or wooden molds are utilized to determine an extruding die opening through which is experimentally extruded rubber. Thus, the configuration of the die pieces or wooden molds are repeatedly corrected and then used to form an extruding die opening through which is extruded rubber on mass production scale. Thus, it takes plenty of time and labor and also requires skilled operations to form an extruding die opening through which is extruded rubber on mass production scale. Moreover, the conventional methods have disadvantages that they cannot be applied to the manufacture of tires for use in high speed driving which requires severe conditions on configuration and quality of the tread rubber.

An object of the invention is to provide an apparatus by which the above mentioned disadvantages encountered with the conventional methods can be obviated and the size of tires can be changed in a very easy and speedy manner.

Another object of the invention is to provide an apparatus wherein the conventional troublesome operations necessary for the manufacture of die pieces or wooden molds each having different configuration whenever the size of tires is changed, are dispensed with.

A further object of the invention is to provide an apparatus by which the configuration of the extruding die can be changed and by which the contour of the rubber product extruded can be corrected in dependence upon the extruding conditions.

A still further object of the invention is to provide an apparatus wherein the dimensions of the configuration of the rubber product extruded are measured and the results measured are compared with the dimensions of a standard configuration to adjust the configuration of the extruding die opening.

Preferred embodiments of the invention have been shown in the drawings, wherein:

FIG. 1 shows diagrammatically a front elevation of an extruding apparatus, partly in section, provided with an extruding die according to the invention;

FIG. 2b is a perspective view of detached parts of the thin sheet unit shown in FIG. 2a;

Figure 3:
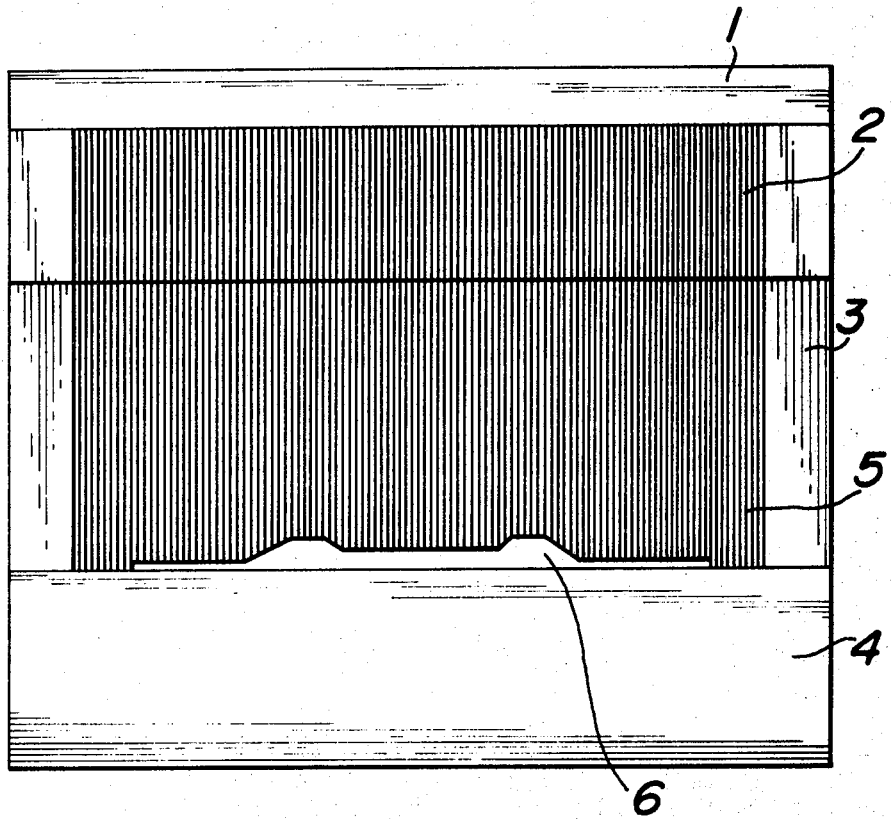
FIG. 3 is an end view of a die opening of an extruding die made up of laminating a number of thin sheet units shown in FIGS. 2a and 2b.

Referring to FIGS. 1 and 3, numeral 1 designates an upper holder which constitutes a part of an extruding die casing of an extruding apparatus and has a strength which is sufficient to withstand the pressure subjected upwards thereto when rubber is extruded into a tread rubber. 2 represents an elongated slidable thin sheet provided at its center portion with an inclined groove. 3 designates a lower holder which cooperates with the upper holder 1 to slidably support a number of the slidable thin sheets 2 sandwiched therebetween. 4 represents a lower die piece made of an elongated plate. 5 shows an upper thin sheet shaped die piece. The slidable thin sheet 2 is in engagement with the upper thin sheet shaped die piece 5 to construct a set of sheet units. A number of sets of sheet units, for example, 250 sets are slidably arranged side by side and laminated to form an upper die piece 5 of an extruding die.

Between the upper edge of the lower die piece 4 and the lower edge of the upper thin sheet shaped die piece 5 is formed an extruding die opening 6. 7 designates a guide member slidably inserted into a groove 8 formed in the lower part of the lower holder 3 for slidably guiding the upper thin sheet shaped die piece 5. The guide member 7 does not prevent the upper thin sheet shaped die piece 5 from becoming moved upwards and downwards and plays a role of supporting the upper thin sheet shaped die piece 5 against the pressure subjected thereto in a direction extruding the rubber when the rubber is extruded into the tread rubber.

9a designates an adjustable bolt for finely adjusting the width of a gap formed between the lower holder 3 and an upper extruder head 10a to a space which is sufficient to allow an easy sliding movement of the upper thin sheet shaped die piece 5.

After the fine adjustment of the bolt 9a has been completed the bolt 9a is locked by a lock nut 9b. 10b designates a lower extruder head secured to the extruding apparatus.

12a represents rubber to be extruded and surrounding a screw extruder 11 and 12b shows a tread rubber extruded. 13a and 13b designate digital oil pressure cylinders, respectively, and 14a shows a plunger of the digital oil pressure cylinder 13a. A plunger 14b of the digital oil pressure cylinder 13b will be shown in FIG. 4. 15a and 15b represent actuators secured to the free ends of the plungers 14a and 14b for operating the slidable thin sheets 2, respectively. 26 designates a contour meter for measuring the contour of the tread rubber 12b.

Figure 2A:
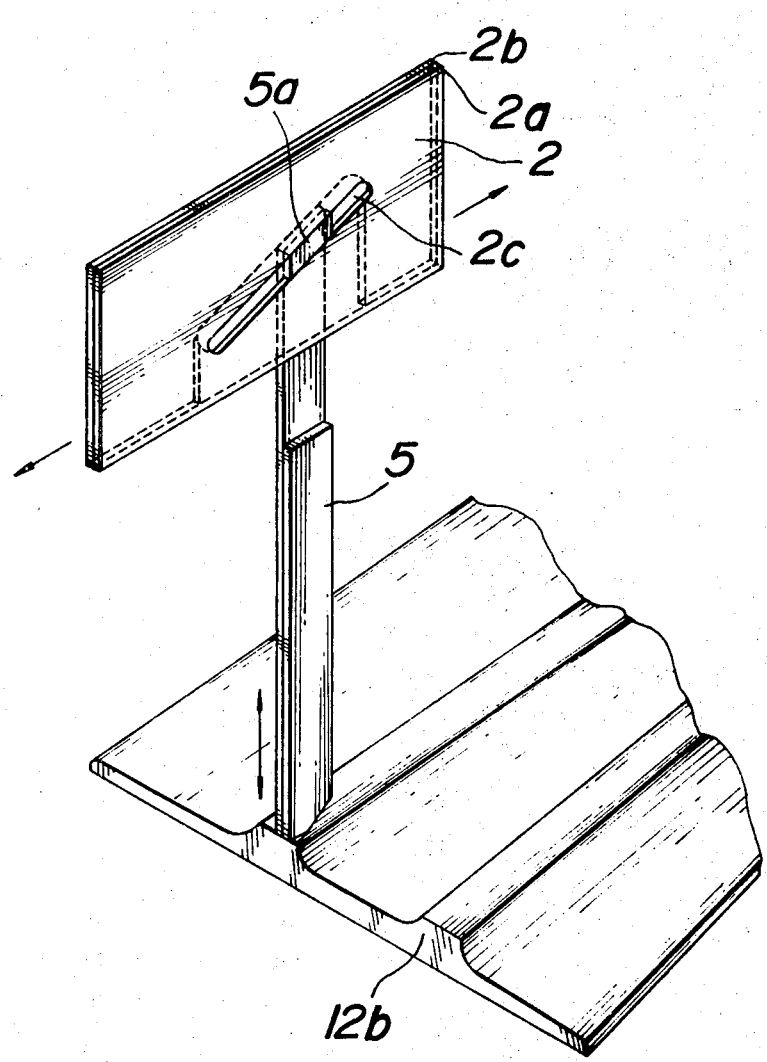
FIG. 2a is a perspective view of the relative arrangement between a thin sheet unit consisting of a slidable thin sheet provided at its center portion with an inclined groove and an upper thin sheet shaped die piece on the one hand and a rubber product formed by extrusion on the other hand.
Figure 2B:
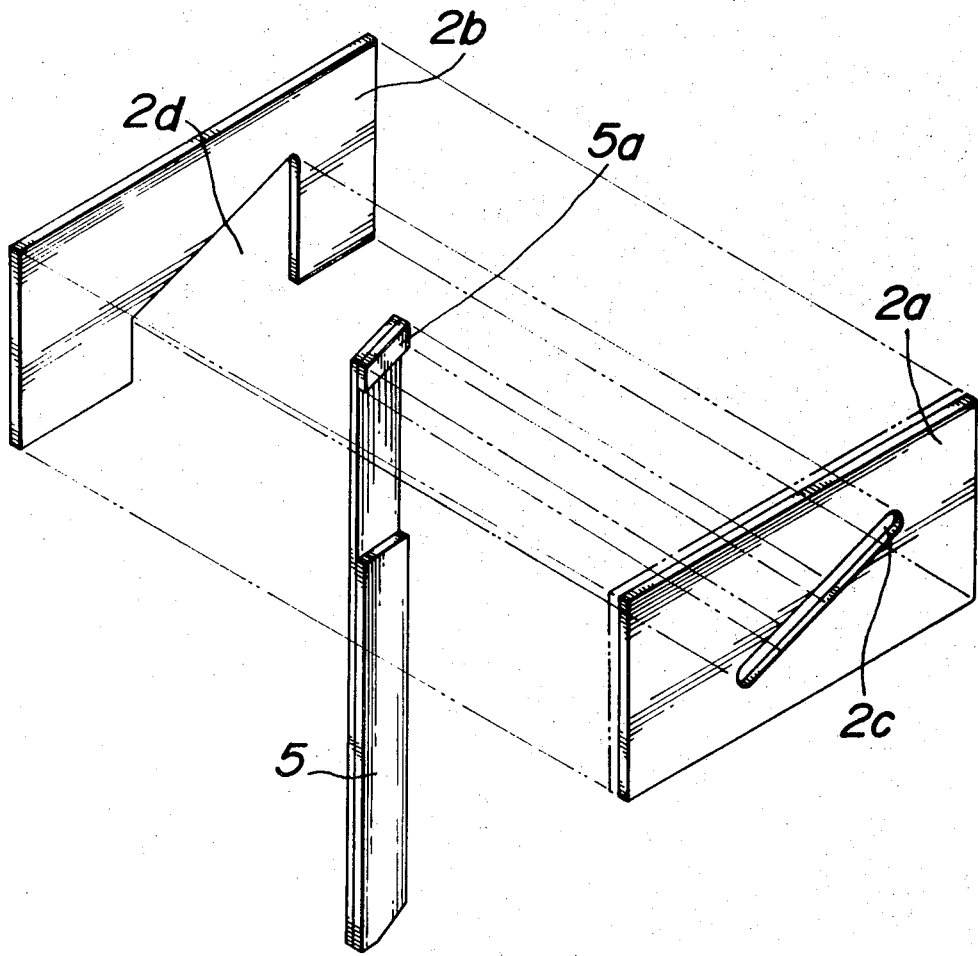

In FIGS. 2a and 2b is shown the relation between the upper thin sheet shaped die piece 5 and the slidable thin sheet 2. The slidable thin sheet 2 is made up of two thin sheet pieces 2a and 2b each having a thickness on the order of 1 mm to several mm. The thin sheet piece 2a is provided at its center portion with an inclined groove 2c, while the thin sheet piece 2b is provided at its center portion with a notch 2d whose upper edge is coincident with the upper edge of the inclined groove 2c of the thin sheet piece 2a and whose width is just the same as that of the latter.

The upper thin sheet shaped die piece 5 is provided at its upper end with a latch piece 5a adapted to be engaged with the inclined groove 2c of the thin sheet piece 2a. The sum of the thickness of both the thin sheet pieces 2a and 2b is made substantially equal to the maximum thickness of the upper thin sheet shaped die piece 5.

The angle of the inclined groove 2c of the thin sheet piece 2a is determined such that the slidable thin sheet 2 could not be moved along the upper thin sheet shaped die piece 5 by the upward force produced when the rubber is extruded through the extruding die. In order to improve the accuracy of controlling the contour of the extruding die opening 6 formed between the lower edge of the upper thin sheet shaped die piece 5 and the upper edge of the lower plate shaped die piece 4, it is best to make the angle of the inclined groove 2c smaller. It is preferable to make the angle of the inclined groove 2c 1:4 in order to economize the space required for assembling the upper thin sheet shaped die piece 5 with the slidable thin sheet 2 and shorten the controlling time, etc.

As above described, the slidable thin sheet 2 and the upper thin sheet shaped die piece 5 are made of two separate thin sheets attached together or they can be made integral into one body.

In FIG. 3 is shown the contour of the extruding die opening for a given tread rubber formed by moving forwards and backwards the slidable thin sheet 2 in the extruding direction and hence by moving upwards and downwards the upper thin sheet shaped die piece 5.

In order to form the extruding die opening 6 shown in FIG. 3, the slidable thin sheet 2 is provided at its center portion with the inclined groove 2c as shown in FIG. 2a and the upper thin sheet shaped die piece 5 is provided at its upper end with the latch piece 5a slidably engaged with the inclined groove 2c.

Thus, if the slidable thin sheet 2 is moved in the extruding direction or in the direction in opposition thereto as shown by arrows in FIG. 2a, the upper thin sheet shaped die piece 5 is caused to be moved upwards or downwards as shown by arrows in FIG. 2a, thereby forming the extruding die opening 6 between the lower edge of the upper thin sheet shaped die piece 5 and the upper edge of the lower plate shaped die piece 4 as shown in FIG. 3.

The upper and lower extruding die pieces 5 and 4 are secured to the extruder heads 10a and 10b, respectively, as shown in FIG. 1 to form the extruding die opening 6. the rubber 12a is extruded through the extruding die opening 6 to form a tread rubber 12b having a given contour as shown in FIG. 1.

The invention relates also to a method of forming by extrusion a rubber product having a given contour, comprising electrically adjusting the extruding die opening with the aid of a plunger of a digital oil pressure cylinder, measuring the contour of the rubber product extruded, and automatically adjusting the extruding die opening.

Figure 4:
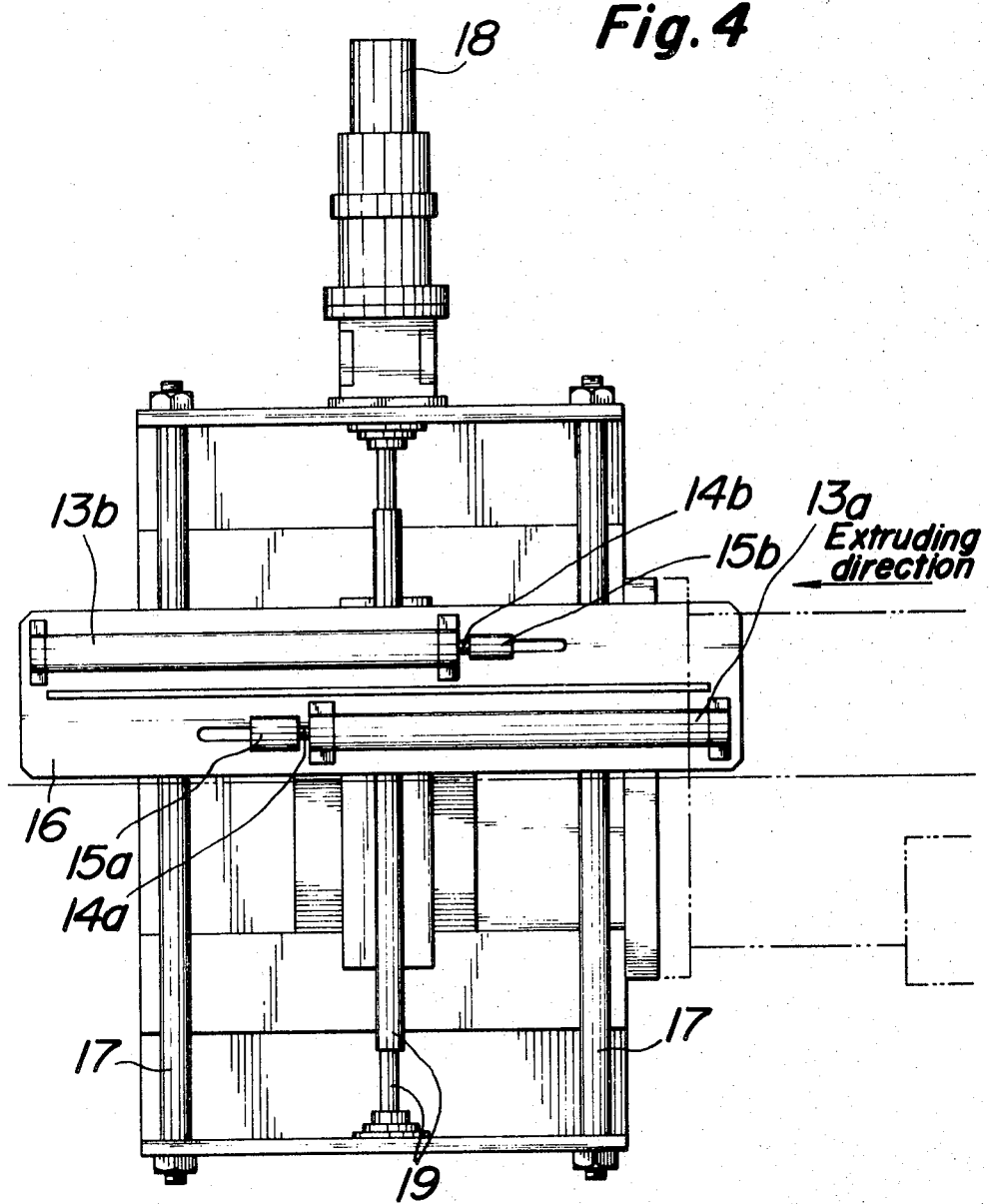
FIG. 4 is a plan view of digital oil pressure cylinders whose plungers serve to adjust the configuration of the die opening of the extruding die shown in FIG. 3.

In FIGS. 1 and 4 are shown the digital oil pressure cylinders 13a and 13b whose plungers 14a and 14b are provided at the front ends thereof with the actuators 15a and 15b, respectively. The actuators 15a and 15b are urged against every one sheet unit of the thin sheet pieces 2a 2b of the slidable thin sheet 2 to move the latter in the extruding direction or in the direction in opposition thereto, with the result that the upper thin sheet shaped die piece 5 is moved upwards and downwards.

In FIG. 4 is shown the digital oil pressure cylinders 13a and 13b secured to a carriage 16 which is slidably supported by guide shafts 17 and adapted to be moved in a direction perpendicular to the extruding direction through a ball screw 19 secured to the carriage 16 by means of an electric pulse motor 18.

The method of automatically adjusting the contour of the extruding die opening 6 by horizontally moving the slidable thin sheet 2 hence moving upwards or downwards the upper thin sheet shaped die piece 5 will be described with reference to a block diagram shown in FIG. 5.

If it is desired to form by extrusion rubber products such as a tread rubber having a given contour, in the first place the dimensions of the configuration similar to those of the rubber product to be formed are coded into a program which is then punched in a tape 20 made of paper.

Then, the end of the punched tape 20 is inserted into a tape reader 21, and a button for starting the feed of the tape 20 is pushed to feed the tape 20 until it arrives at that position of the tape 20 which is provided with punched holes to start the adjusting operation according to the program. Thus, the extruding die opening is ready to be adjusted.

Then, a button for starting the feed of the tape 20 is pressed to feed the tape 20 by one step. The tape reader 21 is operated to read out that amount of movement of the slidable thin sheet 2 which is necessary for moving upwards or downwards the upper thin sheet shaped die piece 5. The read out signal from the tape reader 21 is applied to an electromagnetic valve drive signal amplifier 22. The signal thus amplified is supplied to an electromagnetic valve 25 provided in the digital oil pressure cylinders 13a and 13b for operating the plungers 14a and 14b thereof. Each of the oil pressure cylinders 13a and 13b is provided with several electromagnetic valves 25 each adapted to be operated in different strokes. Thus, a combination of these several electromagnetic valves 25 can determine the amount of movement of the slidable thin sheet 2.

The signal from the electromagnetic valve 25 causes the digital oil pressure cylinders 13a and 13b to operate with the result that the upper thin sheet shaped die piece 5 is operated through the slidable thin sheet 2.

Thus, the first one step of moving the upper thin sheet shaped die piece 5 is completed. As soon as the tape reader 21 delivers the signal that the first step of moving the upper thin sheet shaped die piece 5 has been completed, a time limit circuit 23 is operated to deliver a signal to a pulse motor driving circuit 24 whose output signal is applied to the pulse motor 18 to rotate the latter. The rotation of the pulse motor 18 ensures a feed of the carriage 16 which corresponds to the thicknes of each sheet unit of the upper thin sheet shaped die piece 5 through the ball screw 19. Thus, the second sheet unit of the upper thin sheet shaped die piece 5 becomes ready to be operated by the digital oil pressure cylinder 13a or 13b.

Moreover, another signal is supplied from the pulse motor driving circuit 24 to the tape reader 21 which is then automatically operated to read out a program for the second step.

As described above, each of the 250 sheet units constituting the upper thin sheet shaped die piece 5 is successively moved in the horizontal direction to bring each sheet unit into the position where the plunger 14a or 14b of the digital oil pressure cylinder 13a or 13b acts upon it. At the end of these programs, the end signal punched in the tape 20 is supplied through the tape reader 21 to the electromagnetic valve drive amplifier 22 to stop the operation for adjusting the extruding die and the extruding die is ready for extruding the rubber.

Then, the rubber 12a is extruded through the extruding die opening 6 to form the tread rubber 12b having a given contour. Then, the contour of the tread rubber 12b is measured whether or not its dimension is correct and any deviation from the given dimension is corrected.

The method of measuring the dimension of the contour of the tread rubber 12b and hence correcting any deviation from the given dimension will now be described.

It becomes more difficult to bring accurately the configuration of the extruding die opening 6 obtained by the program of the tape 20 into coincidence with the given configuration of the tread rubber 12b. Thus, the configuration of the extruding die opening 6 obtained by the program of the tape 20 is the primary one.

Figure 5:
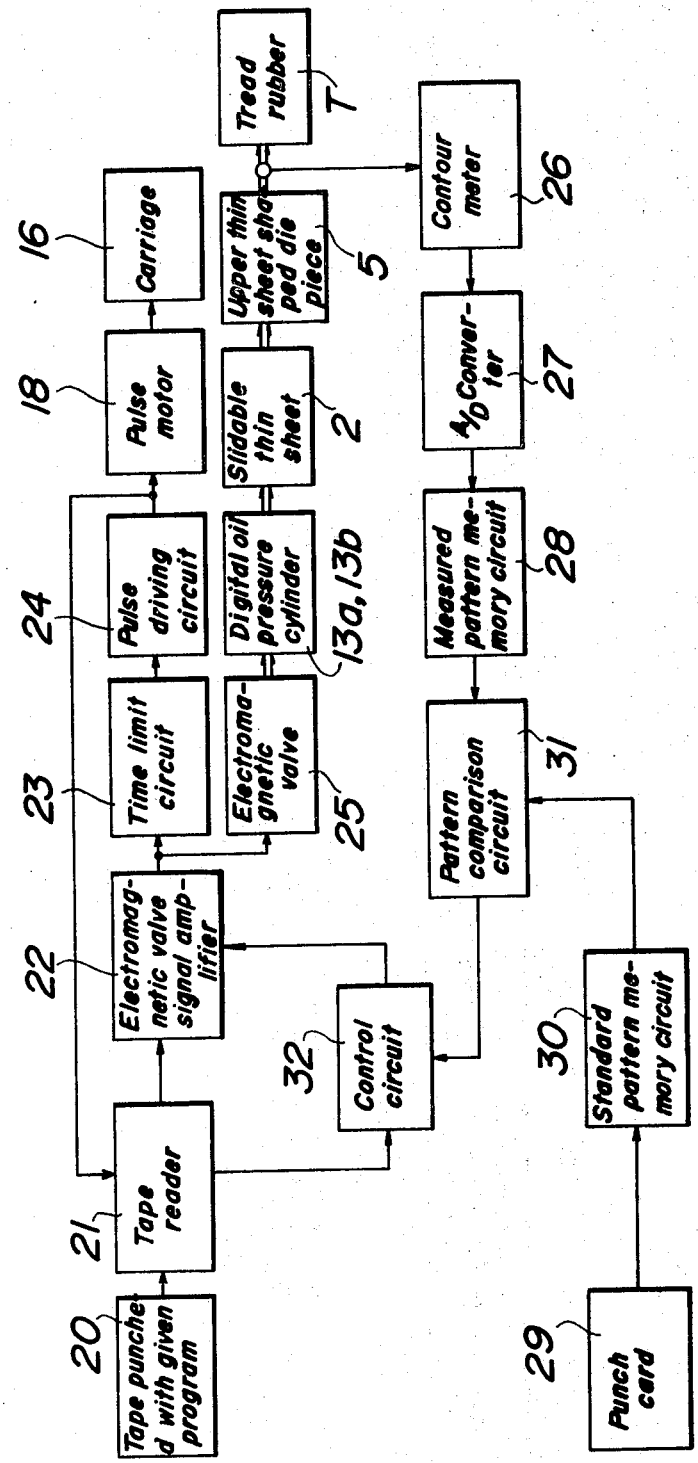
FIG. 5 is a block diagram illustrating successive steps of automatically adjusting the configuration of the die opening of the extruding die according to the invention.

In FIG. 5, the tread rubber T extruded through the primary configuration of the extruding die opening 6 passes through the contour meter 26 which can measure the sectional configuration of the tread rubber T. The results thus measured are supplied as an analog signal to an analog digital converter 27 in which the analog signal is converted into a digital signal for the total width of the tread rubber T at an interval corresponding to the thickness of each of the upper thin sheet shaped die piece 5. This digital signal is supplied to a measured pattern memory circuit 28.

The given configuration of the tread rubber located at the position of the contour meter 26 is punched beforehand in a punch card 29, etc. The read out signal from the punch card 29 is supplied to a standard pattern memory circuit 30 whose output is applied to a pattern comparison circuit 31 which compares the signal with the output from the measured pattern memory circuit 28 and generates a signal equal to the difference between the two. That is, in the pattern comparison circuit 31 the standard pattern from the standard pattern memory circuit 30 is added to the measured pattern from the measured pattern memory circuit 28 such that each output signal from each coordinate of the 250 sheet units automatically displaces its own position so as to make the deviation at each point minimum and the deviation at each point is calculated and the results of this calculation are applied as an output signal to a control circuit 32.

In the control circuit 32, whether or not the deviation from the standard thickness of each point of the tread rubber and the square sum thereof is greater than the given standard value of the tread rubber, is determined. If the deviation and the square sum thereof deviate from the given standard value of the tread rubber, a correction signal corresponding to each upper thin sheet shaped die piece 5 is applied from the control circuit 32 to the electromagnetic valve drive signal amplifier 22. This correction signal is applied to the electromagnetic valve drive signal amplifier 22 after the primary configuration of the extruding die opening has been formed and the end signal from the tape reader 21 has been applied to the electromagnetic valve drive signal amplifier 22.

The electromagnetic valve drive signal amplifier 22 is capable of performing the re-adjustment of the upper thin sheet shaped die piece 5 after the amplifier 22 has received the correction signal from the control circuit 32 in a manner similar to the case in which the amplifier 22 receives the output signal from the tape reader 21.

The method according to the invention shown by the block diagram in FIG. 5 may be modified by adding a control circuit to perform the re-adjustment of that limited portion only of the tread rubber which is required to be corrected.

As stated hereinbefore, the invention has the advantage that it is possible to considerably simplify the complex and troublesome operations encountered in preparatory works for steps of extruding rubber, in replacement of extruding die pieces with new ones when the dimension of the configuration, etc. thereof must be changed, and in newly manufacturing the extruding die pieces, etc., that rubber products such as a tread rubber having any desired configuration can be manufactured without necessitating any skill. Therefore, the invention contributes greatly to the industry.

We claim:

1. An automatic extrusion apparatus for producing tire tread rubbers comprising a plurality of horizontally slidable thin sheets, each of said slidably thin sheets consisting of two sheets of which one sheet is provided with an inclined groove and the other sheet is provided with a notch whose upper edge coincides with the upper edge of said inclined groove, a plurality of vertically slidable thin die pieces each provided at its upper end with a latch piece slidably engaged with said inclined groove, means cooperating with the lower ends of said die pieces to form a die opening, and means for reciprocally moving each of said slidable thin sheets horizontally in the extruding direction so as to move each of said slidable thin die pieces in the vertical direction and thereby adjust the contour of said die opening.

2. The apparatus of claim 1 and further comprising automatic control means for forming a die opening having a given configuration, said automatic control means including a card or tape punched with a predetermined program corresponding to the initial configuration of said die opening, means for measuring the dimensions of the rubber product extruded, means for comparing said measured dimensions with the dimension of a standard configuration, and means for readjusting the configuration of said die opening.

3. The apparatus of claim 1 and further comprising automatic control means for adjusting the contour of said die opening.

4. The apparatus of claim 3 in which said automatic control means includes a card or tape punched with a predetermined program corresponding to the initial contour of said die opening.

5. The apparatus of claim 4 in which said automatic control means comprises means for monitoring the contour of the extruded rubber product.

6. The apparatus of claim 5 in which said automatic control means comprises means for comparing the monitored contour of said extruded rubber product with a predetermined contour pattern and further comprising means for readjusting the contour of said die opening.

7. The apparatus of claim 6 in which said monitoring means comprises a contour meter, an analog to digital converter following said contour meter and a pattern memory circuit for storing the output of said analog to digital converter.

8. The apparatus of claim 6 in which said automatic control means comprises a card or tape punched with said predetermined contour pattern and a pattern memory circuit for storing said predetermined contour pattern.

* * * * *